Patented Dec. 4, 1934

1,983,273

UNITED STATES PATENT OFFICE 1,983,273

MILLING PROCESS

Theodore Earle, Denver, Colo.

No Drawing. Refiled for abandoned application June 1, 1931, Serial No. 541,529. This application October 21, 1933, Serial No. 694,638

9 Claims. (Cl. 75—18)

My invention relates to a process for the recovery of valuable constituents from ore or other material and more especially to a process for the recovery of the valuable constituents from material that can not be properly treated by my former process, application for patent on which was filed April 2, 1931, the Serial Number being 527,355.

In nature many valuable constituents occur combined with other elements as sulphides or in other chemical combinations which are more or less insoluble in any reagent that is cheap enough for commercial use.

Most ores which are mainly sulphides contain smaller amounts of other ores such as sulphates, oxides, or chlorides.

For the most part such ores and materials must be smelted or treated in various ways, all of which tend to raise the recovery cost of the product recovered from such ores and materials above that of the product recovered from the more easily treated materials.

Therefore, the object of my invention is to provide a process for the treatment of such refractory ores.

A further object is to provide a process which will have a low cost per ton of material treated.

A further object is to provide a process which will take the place of the ordinary smelting treatment.

My process broadly comprises subjecting the material to a preliminary heat treatment to put it into the condition required, and then adding a relatively small amount of a dilute solvent, concentrating the solvent by heating the wetted material and thereby driving off the desired amount of water or other diluent from the material and from the solvent, washing the material to put into solution the matter that has been dissolved by the solvent, and recovering the dissolved and freed valuable material from the solution, by precipitation or by any other proper recovery method.

In other words, my process consists of a preliminary heat treatment of the material, and then dissolving the valuable constituents by a dilute solvent with which the material is wet and which is concentrated by heating the material and evaporating the contained water or other diluent, washing the material to put the dissolved material into solution and then recovering the dissolved material from the solution. Copper sulphide ore as found in nature is generally a mixture of copper sulphide and zinc sulphide and possibly sulphides of other metals, but as copper is the generally predominant metal in most of such ores I will hereinafter speak of them as copper sulphides for the sake of brevity.

One specific illustration of the operation of my process will enable anyone versed in the art to adapt it to other conditions and requirements and materials and for this reason what happens in a copper sulphide ore containing lime will be here explained.

The ore is first crushed to the proper mesh and is next roasted, which turns the copper sulphide to copper oxides.

The ore is then wet with the proper amount of dilute acid solution.

The ore is next heated to drive off water from the dilute solution and concentrate the acid, the heat and resulting high temperature also acting to make the acid much more active in dissolving the copper oxides.

If properly performed and controlled the ore, while fairly fresh from the roaster and while still retaining some of its heat, may be wet with the dilute solvent, thus reducing the amount of heat that must be added after the addition of the acid.

Since all excess liquid is removed, each grain or particle of the ore will be covered by a thin film of the dilute acid.

As the heat evaporates the water in this dilute acid film it becomes a hot strong acid film which very actively attacks and dissolves the valuable constituents of the grain or particle.

The grains that are composed of lime or other worthless constituents of the ore, will be surrounded in the same way by an acid film, which finally becomes not only strong but hot. But since there is no excess of acid, each grain of whatever material, will be covered by its own film, and each film will remain on its own grain.

That is, though lime and some other materials would greatly increase the required amount of acid were an excess employed, in my process, with no excess of solvent present, and the grains merely in a moistened condition, a lime grain next to a copper oxide grain will have no harmful effect upon the action of the acid film upon the copper oxide grain.

Since the ore has been roasted it is easily soluble in the acid used (such as sulphuric acid, for instance), and the concentration of the acid as described, together with its high temperature when concentrated, makes the action all the more rapid.

Therefore, the time required for the complete solution of the copper in the hot concentrated acid is but a matter of a few minutes.

The ore is next washed to put into solution the copper that has been dissolved in the strong hot acid, and the copper is then recovered from the solution by precipitation with iron or in any other proper manner desired.

In actual practice, copper sulphide being generally found with at least some copper in other forms, it may be that, after roasting, the ore will contain some copper salts that are soluble in water.

In such a case the roasted ore may be washed in water before the hot acid leach is employed, and the copper recovered from the wash water by precipitation in any proper mannner.

The ore, after the water wash, will then be hot acid leached as described above for the purpose of recovering the copper content that is not soluble in water.

In some ores, it may be found that it will pay to concentrate before roasting.

In such cases the concentrates may be roasted, then washed, the copper recovered from the wash water by precipitation or otherwise, and the remaining roasted ore given a hot acid leach as described above to recover the copper that is insoluble in the wash water and the copper recovered from the solution by precipitation or otherwise, and the tails after the precipitation operation may be treated for gold or other elements.

The tails from the concentration may be given a hot acid leach, washed, and the copper recovered from the wash water by precipitation or otherwise and the tails which were washed may then be treated for gold or other elements.

From the above case it can be seen that there are many steps that can be taken in my process or that can be repeated either on the same or on different parts of the material as it passes through the treatment regardless of the particular flow sheet employed.

Where other than copper ores are to be treated, and other than sulphuric acid used as a solvent, it will be found that variations will naturally be available in order to suit each set of conditions and requirements.

In fitting my process to commercial usage the handling of the material may be effected by any proper means, machines, or methods.

But, whatever, the variations, additions, combinations or repetitions, the main essentials will in all cases remain the same and will consist of heat treating or roasting the ore to make the valuable constitutents soluble in the solvent to be used, wetting the ore with a dilute solvent without excess thereof, heating the ore to concentrate the solvent and to add to its activity by raising its temperature, washing the ore to put the dissolved material into solution, and recovery of the dissolved material from the solution.

It is understood that in my process the material may be put through continuously or in batches, or part of the flow sheet may be continuous and part of it in batches. This includes the de-watering step, if used, after the addition of the dilute solvent.

Also, bins may be provided for storage so that the concentrated solvent film about each grain or particle may be given a longer time in which to dissolve the desired constituents.

Generally, due to the great activity of the hot concentrated solvent, the additional time provided by bins will not be required but they are contemplated for special and perhaps difficult cases.

Though roasting of the material is spoken of as taking place before the addition of the solvent, in some cases it may be found that the material may be roasted at a temperature little if any higher and perhaps even below the boiling temperature of the solvent.

In such cases the roasting and leaching may be performed in one operation.

And, if the solvent dissolves most of the desired constituent before the boiling temperature of the solvent is reached, most of the solvent which may be subsequently evaporated will come from the solvent films enclosing the worthless or inert constituents of the material.

So, if the roasting and leaching is to take place at the same time or substantially so, the roasting time and temperature and the boiling temperature of the solvent used must all be taken into consideration and the best figures for each and the best combination of events for the results required should be determined by testing.

With some material and certain requirements, it may even be found desirable to roast and leach in one operation, wash, and then give the material a second hot solvent leach, and a second wash, and even a third leach and wash, or more. It is thought, however, that like the use of bins as stated above, the repeated leach and wash will be required only in special and difficult cases.

This specification constitutes a substitute patent application for application serial No. 541,529, now abandoned.

Having now described my process, what I claim as new, and desire to protect by Letters Patent, is as follows:

1. The process of recovery of values from natural sulphide ores comprising giving the material a preliminary roasting treatment, subsequently adding sufficient dilute sulphuric acid to dampen each grain of the material, evaporating water from the mass of the acid dampened material by raising its temperature for the purpose of concentrating the acid and making it more active through its increased temperature and recovering the valuable constituents dissolved and freed by the hot active concentrated acid.

2. The process of recovery of values from natural sulphide ores comprising giving the material a preliminary roasting treatment, subsequently adding dilute sulphuric acid sufficient to wet the grains of the material, evaporating a percentage of the water of the dilute acid from the mass of wetted material by raising its temperature and then continuing to raise the temperature of said wetted mass above the boiling point of water for the purpose of concentrating the acid and for the purpose of making it more active through its higher temperature and the recovery of the valuable constituents dissolved and freed by the hot active concentrated acid.

3. The process of the recovery of values from natural sulphide ores comprising giving the ores a preliminary roasting treatment, subsequently adding dilute sulphuric acid, removing the excess of said acid, evaporating a percentage of the water of said dilute acid by raising its temperature and raising the temperature of the material for the purpose of concentrating the acid and making it more active through the addition of heat and then recovering the valuable constituents dissolved and freed by the hot active concentrated acid.

4. The process of dissolving and freeing from the other material the valuable constituents in natural sulphide ores by giving the material as mined a preliminary roasting treatment, subsequently moistening the materal by dilute sulphuric acid and then heating the material to concentrate the acid by evaporation of the water and to add to the acid's activity by raising its temperature and subsequently recovering the constituents dissolved and freed by the hot, active, concentrated acid.

5. The process of the recovery of values from natural sulphide ore comprising giving the material as mined a preliminary roasting treatment, subsequently adding dilute sulphuric acid, evaporating a percentage of the water of the acid by raising the temperature of the mass, continuing to raise the temperature to above the normal boiling point of water for the purpose of making the acid more active as well as more concentrated, washing the material and recovering the valuable constituents dissolved and freed by the hot concentrated acid, by precipitation or otherwise.

6. The process of the recovery of values from natural sulphide ores comprising giving the material as mined a preliminary roasting treatment, subsequently adding dilute sulphuric acid, removing the excess dilute acid, evaporating a percentage of the water of the acid by raising the temperature of the mass and then raising the temperature of the mass above the boiling point of water for the purpose of concentrating the acid and for the purpose of making it more active through its higher temperature, washing the material to put the valuable dissolved and freed constituents into solution, and recovering from the solution the valuable constituents dissolved and freed by the hot concentrated acid by precipitation or otherwise.

7. The process of recovery of values from natural sulphide ores by employing a roasting treatment to put the material as mined in condition to be dissolved by dilute sulphuric acid, subsequently wetting the material by said acid and evaporating a percentage of the water of said acid by heat to concentrate it the required amount and to increase its activity by the required amount of rise in its temperature, washing the material and recovering from the solution the valuable material dissolved and freed by the hot concentrated acid.

8. The process of the recovery of values from natural sulphide ore by employing a roasting treatment to put the material as mined in condition to be dissolved by dilute sulphuric acid, subsequently wetting the material by said acid and evaporating the desired percentage of the water of the acid by heat to concentrate it the required amount and to increase its activity by rise in its temperature, stirring the material to give time for the complete action of the acid, washing the material, and recovering from the solution the valuable matter dissolved and freed by the hot concentrated acid.

9. The process of the recovery of values from natural sulphide ores by employing a roasting treatment to put the material as mined in condition to be dissolved by dilute sulphuric acid, subsequently wetting the material by said dilute acid and evaporating a percentage of the water thereof by heat to concentrate it and to add to its activity by rise in its temperature either simultaneously or subsequent to said heat treatment and after an elapsed period of time washing the material and recovering from the solution the valuable matter dissolved and freed by the hot concentrated acid.

THEODORE EARLE.